(12) United States Patent  
Koyanagi et al.

(10) Patent No.: US 9,829,782 B2  
(45) Date of Patent: Nov. 28, 2017

(54) SCREEN FOR IMAGE LIGHT PROJECTION AND DISPLAY SYSTEM

(71) Applicant: Asahi Glass Company, Limited, Chiyoda-ku (JP)

(72) Inventors: Atsushi Koyanagi, Fukushima (JP); Takuji Nomura, Tokyo (JP); Koji Miyasaka, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/456,635

(22) Filed: Mar. 13, 2017

(65) Prior Publication Data

US 2017/0184954 A1   Jun. 29, 2017

Related U.S. Application Data

(63) Continuation of application No. PCT/JP2015/077198, filed on Sep. 25, 2015.

(30) Foreign Application Priority Data

Sep. 30, 2014   (JP) .................................. 2014-200987

(51) Int. Cl.
  *G03B 21/625* (2014.01)
  *G02B 3/00* (2006.01)
  (Continued)

(52) U.S. Cl.
  CPC ......... *G03B 21/625* (2013.01); *G02B 3/0043* (2013.01); *G02B 3/0056* (2013.01);
  (Continued)

(58) Field of Classification Search
  None
  See application file for complete search history.

(56) References Cited

U.S. PATENT DOCUMENTS

2002/0145797 A1* 10/2002 Sales .................... G02B 3/0043  
  359/456  
2004/0223097 A1   11/2004 Kamijo  
  (Continued)

FOREIGN PATENT DOCUMENTS

JP   2004-252329   9/2004  
JP   2005-17919    1/2005  
  (Continued)

OTHER PUBLICATIONS

International Search Report dated Dec. 8, 2015 in PCT/JP2015/077198, filed on Sep. 25, 2015 ( with English Translation).

(Continued)

*Primary Examiner* — WB Perkey  
(74) *Attorney, Agent, or Firm* — Oblon, McClelland, Maier & Neustadt, L.L.P.

(57) ABSTRACT

An image light projection screen has a plurality of aperiodic lens array units on a main surface. The aperiodic lens array units are arrayed two-dimensionally regularly and without any gap at least in an image display region. Each aperiodic lens array unit includes at least four apexes of micro-lenses each having a curved surface shape and arranged without any gap and non-periodically, and has symmetry keeping continuity of the curved surface shapes of the micro-lenses located in a boundary portion.

19 Claims, 12 Drawing Sheets

(51) Int. Cl.
*G02B 27/01* (2006.01)
*G02B 27/48* (2006.01)
*H04N 9/31* (2006.01)

(52) U.S. Cl.
CPC ......... *G02B 27/0101* (2013.01); *G02B 27/48* (2013.01); *H04N 9/3129* (2013.01); *G02B 2027/013* (2013.01)

(56) References Cited

U.S. PATENT DOCUMENTS

| | | | |
|---|---|---|---|
| 2006/0082902 A1 | 4/2006 | Matsui | |
| 2006/0204901 A1* | 9/2006 | Shimizu | B29D 11/00278 430/321 |
| 2017/0184954 A1* | 6/2017 | Koyanagi | G03B 21/625 |

FOREIGN PATENT DOCUMENTS

| | | |
|---|---|---|
| JP | 2006-119303 | 5/2006 |
| JP | 2007-192989 | 8/2007 |
| JP | 2010-145953 | 7/2010 |

OTHER PUBLICATIONS

Written Opinion dated Dec. 8, 2015 in PCT/JP2015/077198, filed on Sep. 25, 2015.

* cited by examiner

FIG. 17

| NUM-BER | LENS | CLOSEST DISTANCE | | NUM-BER | LENS | CLOSEST DISTANCE | |
|---|---|---|---|---|---|---|---|
| | | DISTANCE [μm] | DIRECTION ETC. | | | DISTANCE [μm] | DIRECTION ETC. |
| 1 | a | 83.6 | $Dx_{af}$ | 9 | i | 81.1 | $Dx_{in}$ |
| 2 | b | 83.6 | $Dx_{bg}$ | 10 | j | 81.1 | $Dx_{jo}$ |
| 3 | c | 83.6 | $Dx_{ch}$ | 11 | k | 81.1 | $Dx_{fk}$ |
| 4 | d | 83.6 | $Dx_{di}$ | 12 | l | 81.1 | $Dx_{gl}$ |
| 5 | e | 83.6 | $Dx_{ej}$ | 13 | m | 81.1 | $Dx_{hm}$ |
| 6 | f | 81.1 | $Dx_{fk}$ | 14 | n | 81.1 | $Dx_{in}$ |
| 7 | g | 81.1 | $Dx_{gl}$ | 15 | o | 81.1 | $Dx_{jo}$ |
| 8 | h | 81.1 | $Dx_{hm}$ | — | — | — | — |

| AVERAGE | 81.9 |
|---|---|
| Max | 83.6 |
| Min | 81.1 |

SCREEN FOR IMAGE LIGHT PROJECTION AND DISPLAY SYSTEM

TECHNICAL FIELD

The present invention relates to an image light projection screen that is a screen on which image light can be projected, and a display system such as a rear projector or a head-up display provided with the image light projection screen.

BACKGROUND ART

A rear projection type projector (rear projector) or a head-up display (HUD) has been known as a projection type display apparatus in which image light is generated using a light source generating coherent light, such as a laser diode, and the image light is projected on a screen. Either of the rear projector and the HUD uses an image light projection screen on which the generated image light can be projected, that is, a so-called transmission type screen. For example, the rear projector uses a transmission type screen so that the image light can be recognized from a side opposed to the light source. On the other hand, in the HUD, the image light transmitted by the transmission type screen is reflected by a combiner so that the image light can be recognized.

To make it possible for human beings to recognize image light projected on a screen, the screen must have a certain level of scattering performance with respect to incident light.

To this end, in the transmission type screen, a random concavity and convexity shape such as frosted glass is often provided in the surface of the screen where an image is projected. Thus, incident image light is diffused.

However, when such a transmission type screen is irradiated with coherent light such as laser light, an interference pattern of the laser light caused by the random structure appears on the projection surface. The interference pattern is called a speckle pattern or a speckle noise. Thus, there is a problem that a clear image cannot be reproduced.

As a technique for reducing the speckle noise caused by the transmission type screen, for example, Patent Document 1 discloses a configuration in which a micro-lens array portion including a plurality of unit lenses arrayed two-dimensionally in a matrix is provided in at least one surface of a translucent substrate.

In addition, Patent Document 2 discloses a transmission type screen including a random phase difference layer in which a plurality of first regions and a plurality of second regions are formed irregularly within a surface of the layer so that incident light can be divided into two linearly polarized components perpendicular to each other, and the linearly polarized components can be emitted.

PRIOR ART REFERENCE

Patent Document

Patent Document 1: JP-A-2005-017919
Patent Document 2: JP-A-2007-192989

SUMMARY OF THE INVENTION

Problems to be Solved by the Invention

The transmission type screen disclosed in Patent Document 1 has a structure in which scattering performance can be added using a curved surface shape. Therefore, the polarization direction of image light incident on the screen is not limited. However, since the micro-lens array having a periodic structure is provided in the transmission type screen disclosed in Patent Document 1, there is a problem that a diffraction pattern or moire may be generated by the periodic structure. Incidentally, a clear image cannot be reproduced when a diffraction pattern or moire is generated.

On the other hand, in the transmission type screen disclosed in Patent Document 2, the random phase difference layer must be disposed so that a slow axis thereof can be inclined at +45° or −45° with respect to the polarization direction of image light incident as linearly polarized light. To say other words, the polarization direction of the incident image light must be controlled to establish such an angular relationship. For a configuration in which the polarization direction of the incident light is limited thus, a function of controlling the polarization direction must be added to a display apparatus that should be irradiated with the image light or into an optical path through which the radiated image light should reach the screen. This is not preferable.

It is therefore an object of the invention to provide an image light projection screen in which a polarization direction of image light incident thereon is not limited but a cause of lowering image quality, including a diffraction pattern or moire as well as speckle noise, can be reduced. In addition, it is another object of the invention to provide a display system provided with such an image light projection screen.

Solution to the Problems

An image light projection screen according to the invention includes: a plurality of aperiodic lens array units on a main surface of the image light projection screen, the aperiodic lens array units being arrayed two-dimensionally regularly and without any gap at least within an image display region; wherein: each of the aperiodic lens array units includes at least four apexes of micro-lenses each having a curved surface shape and arranged without any gap and non-periodically, and has symmetry keeping continuity of the curved surface shapes of the micro-lenses located in a boundary portion.

In addition, a display system according to the invention includes: an image projection apparatus including a light source that emits coherent light, an image light forming unit that modulates a beam of the light emitted from the light source in accordance with image information so as to form image light, and a projection optical system that enlarges and projects the image light toward a predetermined screen surface; and a transmission type screen; wherein: the transmission type screen is the aforementioned image light projection screen.

Advantageous Effects of the Invention

According to the invention, it is possible to provide an image light projection screen and a display system capable of reducing a cause of lowering image quality without limiting a polarization direction of image light.

BRIEF DESCRIPTION OF THE DRAWINGS

FIG. 1A is a schematic top view showing an example of the image light projection screen according to the first embodiment, and FIG. 1B is a schematic top view showing an example of an aperiodic lens array unit 11.

FIG. 2A is a schematic view of the aperiodic lens array unit 11 shown in FIG. 1B, and FIG. 2B is an explanatory view for explaining the degree of dispersion of micro-lenses within the aperiodic lens array unit 11.

FIG. 3A is a view showing an example of how to capture an L-axis and a V-axis, and FIG. 3B is a view showing another example of how to capture an L-axis and V-axis.

FIG. 8A is a schematic view showing a state of light incident on the image light projection screen and light scattered and transmitted thereby, and FIG. 8B is a view showing a distribution of light intensity when an angle between an optical axis and a light beam is used as abscissa, the light beam starting at a point where the image light projection screen crosses the optical axis, the light beam traveling toward the section taken on line A-A' in FIG. 8A.

FIG. 17 is an explanatory view collectively showing closest distances between apexes of micro-lenses in the first embodiment.

MODES FOR CARRYING OUT THE INVENTION

Embodiment 1

Figure 1A:
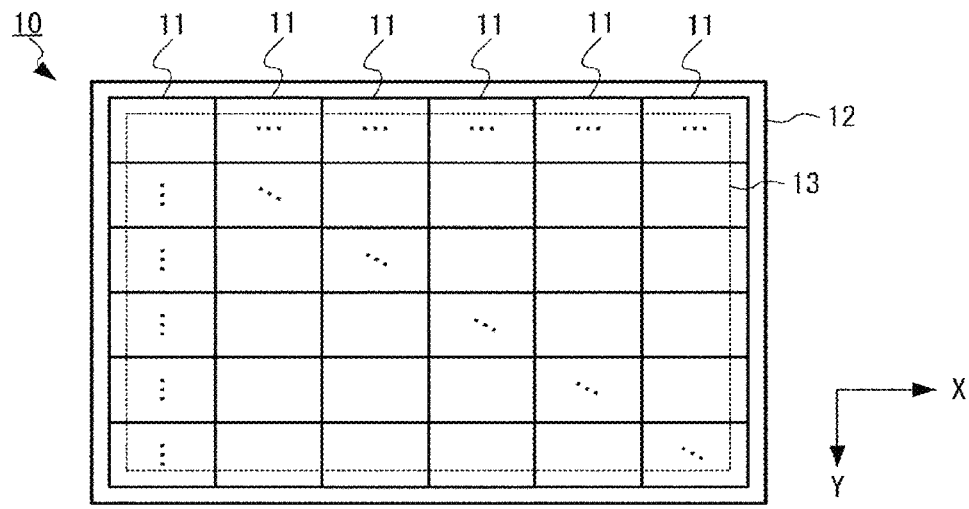
FIGS. 1A and 1B are schematic views showing an example of an image light projection screen according to a first embodiment.

An embodiment of the invention will be described below with reference to the drawings. FIG. 1A is a schematic top view showing an example of an image light projection screen 10 according a first embodiment. The image light projection screen 10 shown in FIG. 1A has a plurality of aperiodic lens array units 11 arrayed two-dimensionally regularly to fill at least an image display region 13 for displaying an image in a main surface 12. Incidentally, to fill a plane region, that is, to fill the image display region 13 is more specifically that there is no gap at least within the region.

Figure 1B:
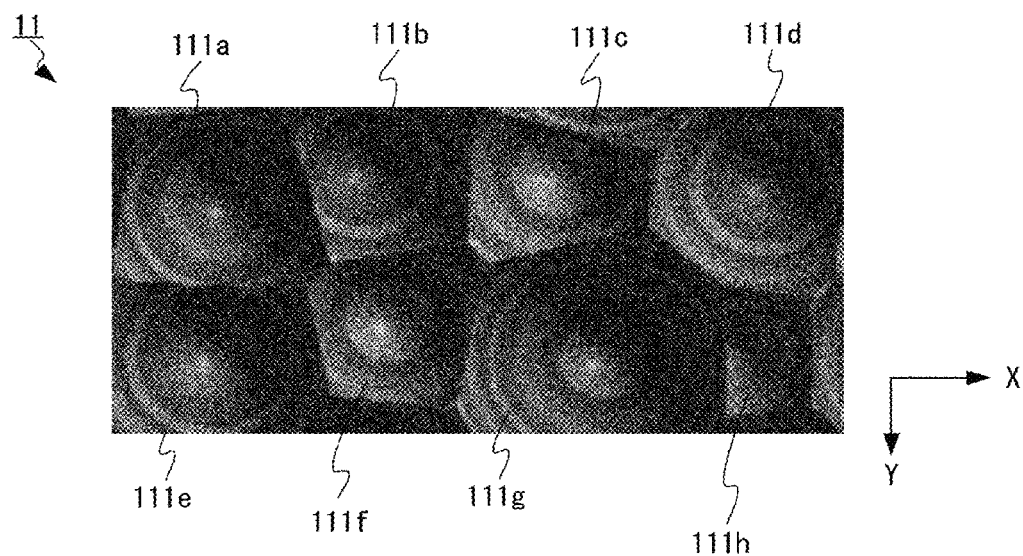

In addition, FIG. 1B is a schematic top view showing an example of an aperiodic lens array unit 11. Incidentally, in FIG. 1B, gradation density corresponds to height (or depth) of each region. As shown in FIG. 1B, each aperiodic lens array unit 11 includes four or more apexes of micro-lenses 111 each having a curved surface shape and arranged without any gap and non-periodically. To say other words, at least four apexes of micro-lenses 111 each having a curved surface shape are arranged without any gap and non-periodically within each aperiodic lens array unit 11. More specifically, there is no flat region within each aperiodic lens array unit 11 but, of closest distances between apexes of micro-lenses, at least one closest distance different from any other is included in the group of micro-lenses 111 belonging to the aperiodic lens array unit 11. Incidentally, it is more preferable that all the combinations of different micro-lenses 111 have different closest distances.

In addition, the number of apexes of micro-lenses belonging to each aperiodic lens array unit 11 is preferably at least six and more preferably at least ten in order to reduce a diffraction pattern or moire caused by a periodic structure. In addition, the number of the apexes is preferably at most 100 and more preferably at most 50 in order to reduce speckle noise caused by an aperiodic structure.

FIG. 1B shows an example in which eight micro-lenses 111a, 111b, 111c, 111d, 111e, 111f, 111g and 111h are arranged substantially in two rows and four columns along two axes perpendicular to each other (X-axis and Y-axis in FIG. 1B). However, distances between the apexes of the micro-lenses 111 are not uniform but include a variation. Incidentally, the distances between the apexes are distances between the apexes in planar view on the X-Y plane in FIG. 1B, taking no consideration into the depth direction (Z-direction).

In addition, the aperiodic lens array units 11 each having a quadrangular outer edge shape are shown in FIG. 1A and FIG. 1B. However, the outer edge shapes of the aperiodic lens array units 11 are not limited especially as long as they have shapes that can fill a plane region without any gap. For example, the shapes may be hexagons. Even when the shapes are quadrangles, they are not limited to rectangles, but may be squares or rhombuses. In addition, when they are quadrangular or hexagonal, they may include shapes whose sides are not straight lines but wavy lines. In addition, it is preferable that the outer edge shapes of the aperiodic lens array units 11 are quadrangles or hexagons which are shapes capable of filling a plane region only by a translational operation. However, they may be shapes capable of filling a plane region by a symmetric operation including a rotation operation or a mirror operation (for example, triangles or trapezoids).

For example, when there occurs a gap among the micro-lenses 111, the region of the gap has a flat surface shape, in which light radiated to the region is not diffused but transmitted straightly. In order to prevent this, for example, it may be considered that a black mast for blocking the transmitted light is, for example, formed in accordance with the flat region. However, it is not preferable because it causes complication of the structure and loss of light quantity.

In addition, as shown in FIG. 1B, each aperiodic lens array unit 11 may include parts of micro-lenses 111 belonging to other aperiodic lens array units 11 in its outer edge portion. However, as a condition for disposing the aperiodic lens array units 11 in a plane region without any gap, symmetry must be secured with respect to the layout of a micro-lens array on each side so that continuity of curved surface shapes of micro-lenses can be kept in a boundary portion when the aperiodic lens array units 11 are arrayed two-dimensionally. The condition is not applied to a portion where a boundary between aperiodic lens array units 11 overlaps with a boundary between micro-lenses. Incidentally, when continuity of lens shapes is kept in the boundary portion between the aperiodic lens array units 11, the micro-lenses 111 may be disposed at random inside the boundary portion (within each unit).

Incidentally, in order to suppress a variation in distribution of light quantity in a destination of light transmitted by the image light projection screen 10, it is preferable that dispersion of micro-lenses 111 disposed within each aperiodic lens array unit 11 is put into a predetermined range.

The following description will be made using closest distances between apexes of micro-lenses as an index indicating the degree of dispersion in a plane layout. For example, assume that 15 apexes of micro-lenses are included in one aperiodic lens array unit 11. In this case, closest distances D1 to D15 between the apexes are calculated. It is preferable that all the closest distances D1 to D15 between the apexes of the micro-lenses are put within ±10% of an average $D_{ave}$ of those closest distances D1 to D15. That is, it is preferable that the following conditional expression (1) is satisfied all over n=1 to N (N is the number of apexes of micro-lenses belonging to the unit (N≥4)). Incidentally, it will go well if, of the closest distances D1 to DN, at least one includes a different value from the others in the conditional expression (1) and the conditional expression (2), and it is more preferable that all the closest distances D1 to DN are different from one another.

$$0.9 \times D_{ave} \leq Dn \leq 1.1 \times D_{ave} \tag{1}$$

For example, when the closest distances D1 to DN depart largely from the aforementioned conditional expression (1), that is, when the degree of dispersion is too large, speckle noise caused by aperiodicity increases unfavorably.

Incidentally, assume that a condition that symmetry is secured and a condition that there is no gap (filling rate of 100%) are satisfied, in spite of the aforementioned condition as to the dispersion. Incidentally, it is preferable that a quantity of deviation from the average is within ±5%. That is, it is more preferable that the following conditional expression (2) is satisfied all over n=1 to N.

$$0.95 \times D_{ave} \leq Dn \leq 1.05 \times D_{ave} \tag{2}$$

Figure 2A:
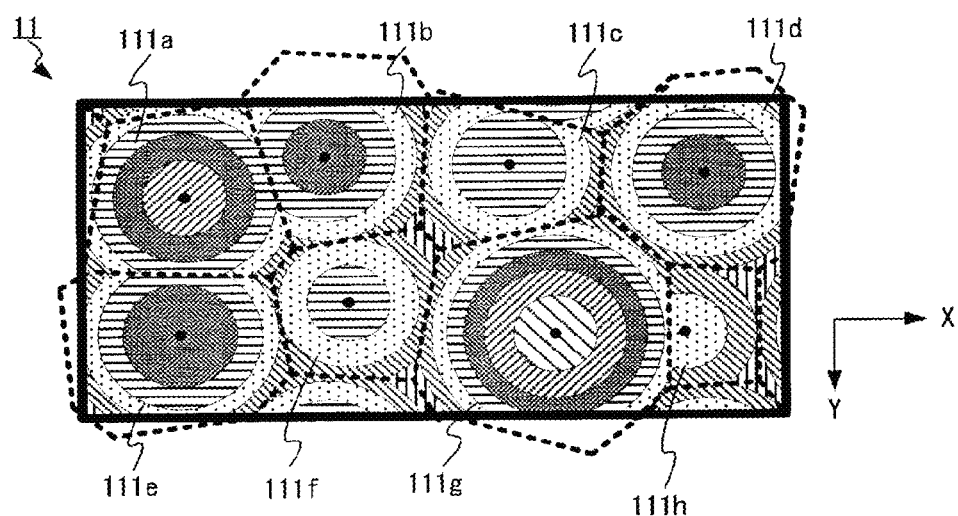
FIGS. 2A and 2B are schematic views of the aperiodic lens array unit 11.

In addition, the degree of dispersion of micro-lenses 111 disposed within each aperiodic lens array unit 11 may be evaluated using the following standard pitches. FIG. 2A is a schematic view of the aperiodic lens array unit 11 shown in FIG. 1B. In FIG. 2A, shading corresponds to height (or depth) of each region. In addition, thick broken lines designate boundaries among the micro-lenses 111. In addition, black dots designate positions of apexes of the micro-lenses 111.

Figure 2B:
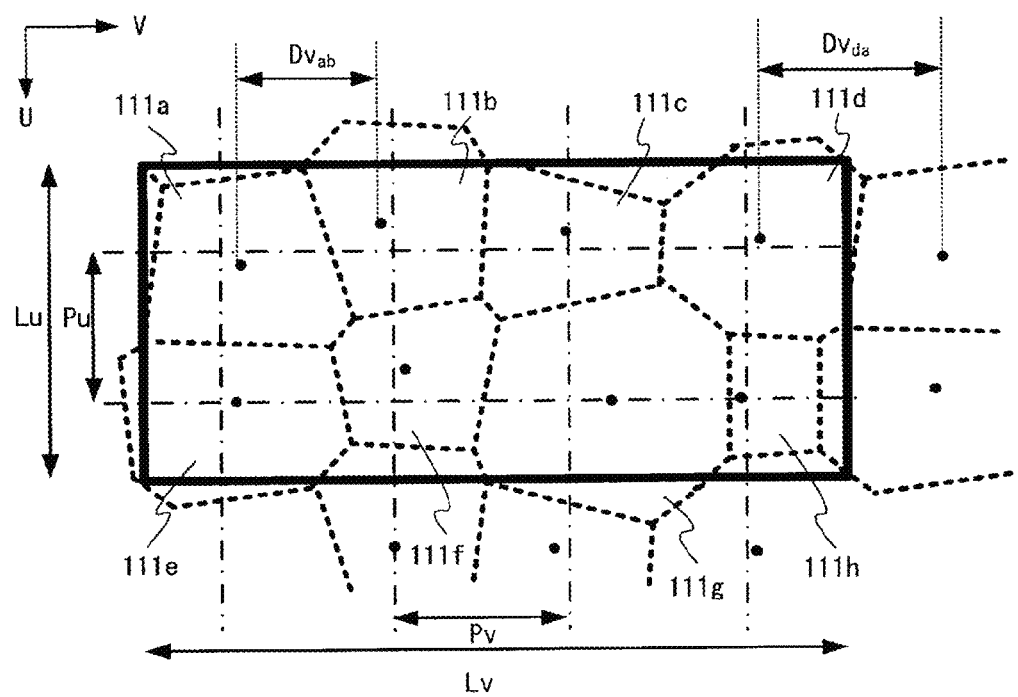

On the other hand, FIG. 2B is a view for explaining the degree of dispersion of the micro-lenses 111 within the aperiodic lens array unit 11. In FIG. 2B, alternate long and short dashes lines designate standard pitches.

Here, assume that Lu and Lv designate any two lengths in axial directions (for example, the illustrated U-axis direction and the illustrated V-axis direction) crossing each other in the aperiodic lens array unit 11. In this case, assume that at least M apexes of micro-lenses are arrayed substantially in parallel with a first axial direction, which is the axial direction of the length Lu in a region measuring the length Lu, and at least J apexes of micro-lenses are arrayed substantially in parallel with a second axial direction, which is the axial direction of the length Lv in a region measuring the length Lv. In the case of such a design, the standard pitches correspond to Lu/M and Lv/J. More specifically, Lu/M is a first standard pitch Pu, and Lv/J is a second standard pitch Pv. Incidentally, in the example shown in FIG. 2, M=2, and J=4.

Based on the standard pitches configured thus, each micro-lens 111 within the aperiodic lens array unit 11 has distances Du1 and Du2 from apexes of two micro-lenses adjacent on the plus side and the minus side in the first direction, and distances Dv1 and Dv2 from apexes of two micro-lenses adjacent on the plus side and the minus side in the second direction. It is preferable that each of the distances Du1 and Du2 has a quantity of deviation from the first standard pitch Pu within ±10%, and Du1 is not equal to Du2, while each of the distances Dv1 and Dv2 has a quantity of deviation from the second standard pitch Pv within ±10%, and Dv1 is not equal to Dv2. Incidentally, a micro-lens located at an end of the unit has only one micro-lens adjacent thereto. In this case, a distance from an apex of a micro-lens within another aperiodic lens array unit 11 beyond the boundary of the aperiodic lens array unit 11 in question and adjacent to the micro-lens in question is used based on the symmetry of the units.

That is, it is preferable that each micro-lens 111 within each aperiodic lens array unit 11 satisfies all the following set of conditional expressions (3).

$$0.9 \times Pu \leq Du1 \leq 1.1 \times Pu$$

$$0.9 \times Pu \leq Du2 \leq 1.1 \times Pu$$

$$0.9 \times Pv \leq Dv1 \leq 1.1 \times Pv$$

$$0.9 \times Pv \leq Dv2 \leq 1.1 \times Pv$$

$$Du1 \neq Du2$$

$$Dv1 \neq Dv2 \tag{3}$$

Here, Du1 may be a distance in the first direction from an apex of a micro-lens adjacent to the micro-lens in question on the plus side substantially in the first direction. In addition, Du2 may be a distance in the first direction from an apex of a micro-lens adjacent to the micro-lens in question on the minus side substantially in the first direction. In addition, Dv1 may be a distance in the second direction from an apex of another micro-lens adjacent to the micro-lens in question on the plus side substantially in the second direction. In addition, Dv2 may be a distance in the second direction from an apex of another micro-lens adjacent to the micro-lens in question on the minus side substantially in the second direction.

For example, as shown in FIG. 2B, assume that a distance between apexes of two micro-lenses 111 adjacent to each other in an axial direction is expressed as $D\{\gamma\}_{\{\alpha\}\{\beta\}}$. Incidentally, a sign identifying the axial direction (U or V in the example of FIG. 2B) is put into $\{\gamma\}$. In addition, a sign identifying the micro-lens 111 on the minus side in the axial direction (an alphabet following the sign 111 of the micro-lens in the example of FIG. 2B) is put into $\{\alpha\}$. In addition, a sign identifying the micro-lens 111 on the plus side is put into $\{\beta\}$. For example, in the example shown in FIG. 2B, the distance between apexes of a micro-lens 111a and a micro-lens 111b adjacent to each other in the V-axis direction is expressed as $Dv_{ab}$. This expression method is also applied to a distance between apexes of two units. For example, in the example shown in FIG. 2B, the distance between apexes of a micro-lens 111d and a micro-lens 111a of another unit adjacent to each other in the V-axis direction is expressed as $Dv_{da}$.

For example, when the aforementioned set of conditional expressions (3) are applied to the example shown in FIG. 2B, the following set of conditional expressions (4) can be obtained. To say other words, it is more preferable that each micro-lens in the aperiodic lens array unit 11 shown in FIG. 2B is disposed to satisfy all the following set of conditional expressions (4).

$$0.9 \times Pv \leq Dv_{ab} \leq 1.1 \times Pv$$

$$0.9 \times Pv \leq Dv_{bc} \leq 1.1 \times Pv$$

$$0.9 \times Pv \leq Dv_{cd} \leq 1.1 \times Pv$$

$$0.9 \times Pv \leq Dv_{da} \leq 1.1 \times Pv$$

$$Dv_{ab} \neq Dv_{bc}$$

$$Dv_{bc} \neq Dv_{cd}$$

$$Dv_{cd} \neq Dv_{da}$$

$$0.9 \times Pv \leq Dv_{ef} \leq 1.1 \times Pv$$

$$0.9 \times Pv \leq Dv_{fg} \leq 1.1 \times Pv$$

$$0.9 \times Pv \leq Dv_{gh} \leq 1.1 \times Pv$$

$$0.9 \times Pv \leq Dv_{he} \leq 1.1 \times Pv$$

$$Dv_{ef} \neq Dv_{fg}$$

$$Dv_{fg} \neq Dv_{gh}$$

$$Dv_{gh} \neq Du_{he}$$

$$0.9 \times Pu \leq Du_{ae} \leq 1.1 \times Pu$$

$$0.9 \times Pu \leq Du_{bf} \leq 1.1 \times Pu$$

$$0.9 \times Pu \leq Du_{cg} \leq 1.1 \times Pu$$

$$0.9 \times Pu \leq Du_{dh} \leq 1.1 \times Pu$$

$$0.9 \times Pu \leq Du_{ea} \leq 1.1 \times Pu$$

$$0.9 \times Pu \leq Du_{fb} \leq 1.1 \times Pu$$

$$0.9 \times Pu \leq Du_{gc} \leq 1.1 \times Pu$$

$$0.9 \times Pu \leq Du_{hd} \leq 1.1 \times Pu$$

$$Du_{ae} \neq Du_{ea}$$

$$Du_{bf} \neq Du_{fb}$$

$$Du_{cg} \neq Du_{gc}$$

$$Du_{dh} \neq Du_{hd} \quad (4)$$

Incidentally, also in this case, assume that the condition that symmetry is secured and the condition that there is no gap (filling rate of 100%) are satisfied, in spite of the aforementioned condition as to the dispersion. In addition, although the example in which the quantity of deviation from each standard pitch is within ±10% is shown in the aforementioned sets of conditional expressions (3) and (4), it is more preferable that the quantity of deviation from each standard pitch is within ±5%.

Figure 3A:
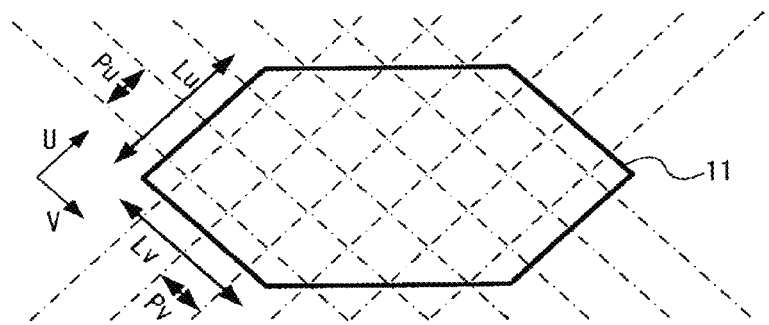
FIGS. 3A and 3B are explanatory views showing an example of standard pitches in a hexagonal aperiodic lens array unit 11.
Figure 3B:
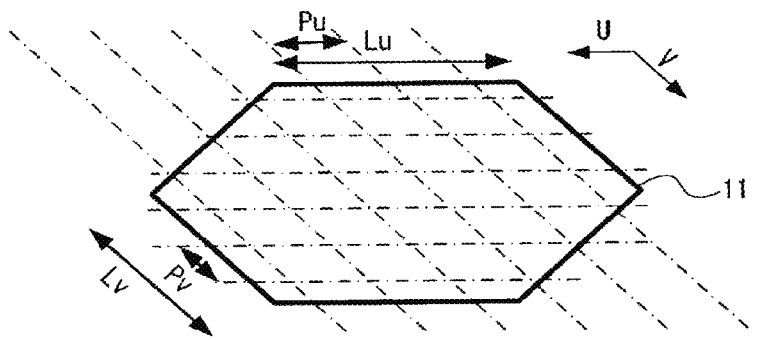

In addition, FIG. 2B shows the example in which each aperiodic lens array unit 11 has a rectangular outer edge shape (each interior angle is 90 degrees), and axes parallel to two sides thereof are used as the first axis and the second axis. However, it will go well if the first axis and the second axis which are also array directions of micro-lenses within the unit cross each other. The first axis and the second axis do not have to be orthogonal axes. In addition, the first axis and the second axis do not have to be parallel with the sides of the aperiodic lens array unit. FIG. 3A and FIG. 3B are explanatory views showing an example of standard pitches when the outer edge shape of each aperiodic lens array unit 11 is hexagonal. FIG. 3A and FIG. 3B show examples different in how to capture the U-axis and V-axis. Various conditions described above are also applied to the case where the outer edge shape of each aperiodic lens array unit 11 is hexagonal.

In addition, when the micro-lenses 111 are arranged substantially in parallel with both the first axis and the second axis which are two axial directions crossing each other as shown in FIGS. 2A and 2B, it is preferable that the number of apexes belonging to the aperiodic lens array unit 11 in each axial direction is at least two and at most ten. For example, when the number of apexes in one axial direction is only one, that is, when M=1 in the example of FIG. 2B, only combinations of micro-lenses in one row and four columns belong to the aperiodic lens array unit 11 in spite of their aperiodic arrangement. Therefore, when such aperiodic lens array units 11 are repeated periodically, periodicity in the axial direction (for example, in the U-axis direction) is too high unfavorably. Incidentally, when the periodicity is too high, there is a fear that a diffraction pattern or moire may appear intensively due to the periodic structure. On the contrary, when the number of apexes in one axial direction is too large, the number of apexes included in the unit as a whole is also increased. Therefore, there is a fear that aperiodicity is so high that speckle noise may be conspicuous. As described above, roughly in order to make the number of apexes of lens arrays belonging to the aperiodic lens array unit 11 as a whole not larger than 100, it is preferable that the number of apexes in each axial direction is not larger than 10.

Figure 4:
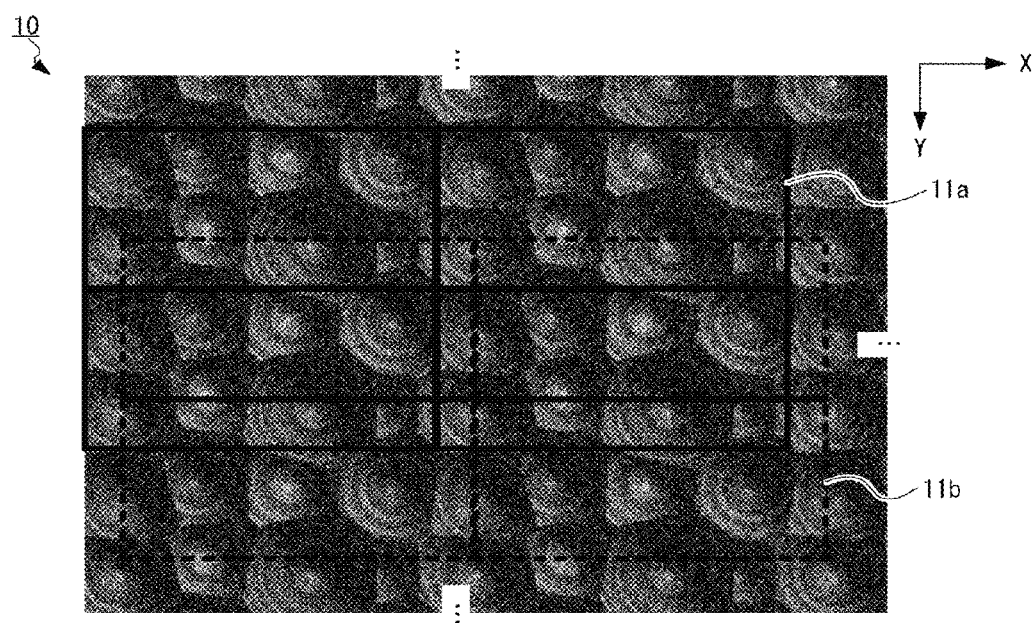
FIG. 4 is an explanatory view showing a layout example of aperiodic lens array units 11.

In addition, in the example shown in FIG. 1B and FIG. 2A, positions of boundaries of each aperiodic lens array unit 11 are defined near positions of boundaries of micro-lenses in order to make it possible to easily understand the state of micro-lenses arrayed within the aperiodic lens array unit 11. However, the positions of the boundaries of the unit are not limited thereto. For example, when one kind of aperiodic lens array unit 11 is arrayed periodically in an image display region, that is, in a case of a repeating structure, positions of boundaries can be set in a plurality of ways as shown in FIG. 4. In FIG. 4, an aperiodic lens array unit 11a is an example in which positions of boundaries have been set to have the same structure as the aperiodic lens array unit 11 shown in FIG. 1B. On the other hand, an aperiodic lens array unit 11b is an example in which positions of boundaries have been set in another way. In the example shown in FIG. 4, the overall structure is not changed if it is separated at any place.

Incidentally, the image light projection screen 10 according to the embodiment may be also expressed as the image display region has a repeating structure of a set of micro-lenses arranged non-periodically and without any gap. For example, the case shown in FIG. 4 has a repeating structure of a set of micro-lenses arranged in two rows and four columns non-periodically and without any gap in axial directions (X-axis direction and Y-axis direction) parallel to two sides forming the image display region.

Figure 5:
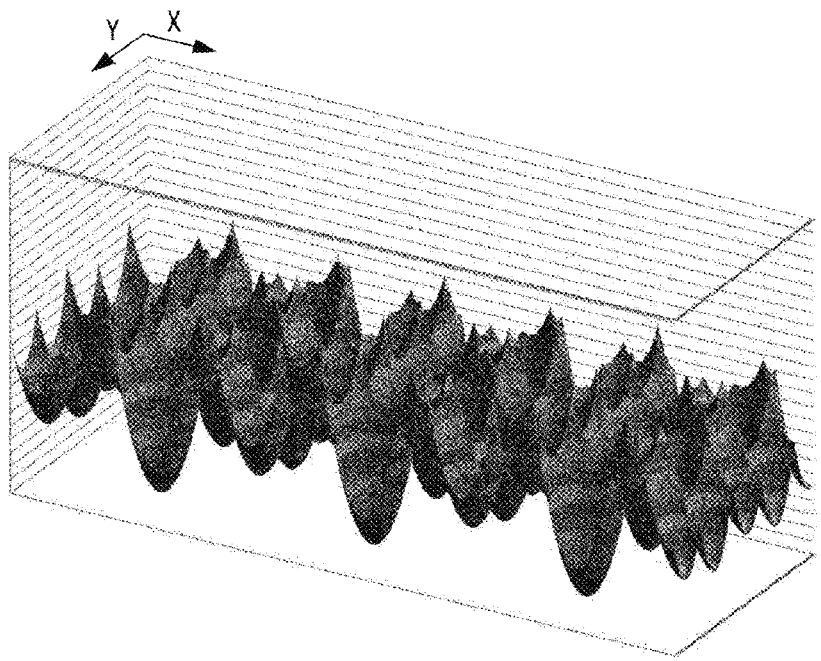
FIG. 5 is a perspective view showing an example of a surface shape of the aperiodic lens array unit 11.

In addition, FIG. 5 is a perspective view showing an example of surface shapes of aperiodic lens array units 11. FIG. 5 shows an example of a surface shape of a region in which aperiodic lens array units 11 each having concave-type micro-lenses arranged non-periodically and substantially in two rows and four columns are arrayed in two rows and three columns. As shown in FIG. 5, in the image light projection screen 10 according to the embodiment, it is preferable that heights of apexes of micro-lenses 111 are not coincident with one another within each aperiodic lens array unit 11. More specifically, it is preferable that the group of micro-lenses 111 belonging to each aperiodic lens array unit 11 include at least one micro-lens whose apex height is different from any other apex height. Here, assume that height of an apex of a micro-lens is a distance (height or depth) in a height direction between a reference plane set for the aperiodic lens array unit 11 and the apex of the micro-lens. Incidentally, it is more preferable that all the micro-lenses have different apex heights from one another. For example, when a least square plane of the image display region can be recognized, it is preferable that the least square plane is used as the reference plane. When it is difficult to recognize the least square plane, a plane obtained by connecting highest points (some points of boundary portions between micro-lenses if the micro-lenses are concave type ones, and apexes of micro-lenses if the micro-lenses are convex type ones) of three aperiodic lens array units 11 may be used as the reference plane It is preferable that dispersion among the micro-lenses is also put within a predetermined range in the height direction.

Figure 6:
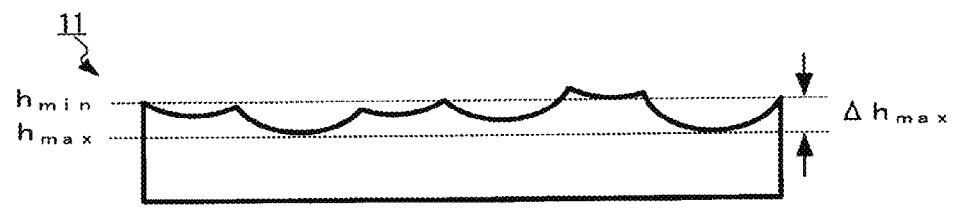
FIG. 6 is a schematic sectional view showing an example of height positions of apexes of micro-lenses 111 in the aperiodic lens array unit 11.

The following description will be made using a difference $\Delta h$ in height of each of apexes of micro-lenses 111 as an index indicating the degree of dispersion in the height direction. FIG. 6 is a schematic sectional view showing an example of height positions of apexes of micro-lenses 111 within an aperiodic lens array unit 11. As shown in FIG. 6, a maximum quantity of differences $\Delta h$ in height between apexes in respective combinations of the micro-lenses 111 within the aperiodic lens array unit 11 is defined as a maximum difference $\Delta h_{max}$. In the aperiodic lens array unit 11 according to the embodiment, it is preferable that optical path length of the maximum difference $\Delta h_{max}$ (refractive index $n \times \Delta h_{max}$) is at least $1\lambda$. Here, $\lambda$ designates the wavelength of incident light.

When the number of target wavelengths is not one, it will go well if the aforementioned conditions are satisfied for a predetermined one of wavelengths of incident light. For example, in the case of visible light, the wavelength of the light may be regarded as a green wavelength. In this case, a band of 532 nm or 530 nm (more specifically 5110 nm to 550 nm) may be set as a design wavelength. That is, a central wavelength or a wavelength band with a predetermined width (for example, 10 nm) around the central wavelength may be set as a target.

When the optical path length of the maximum difference $\Delta h_{max}$ is smaller than $1\lambda$, there is a fear that a diffraction pattern may appear easily. Incidentally, the maximum difference $\Delta h_{max}$ may be also defined as a difference between height of the highest apex (for example, $h_{max}$ in FIG. 6) and height of the lowest apex (for example, $h_{min}$ in FIG. 6) in the group of micro-lenses 111 belonging to the aperiodic lens array unit 11.

Figure 7:
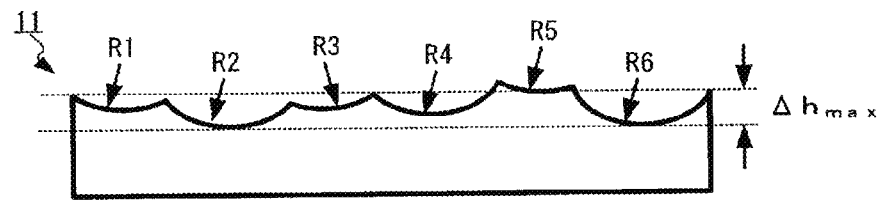
FIG. 7 is a schematic sectional view showing an example of curvature radii of the micro-lenses 111 in the aperiodic lens array unit 11.

In addition, as shown in FIG. 7, it is preferable that the micro-lenses 111 have curvature radii R substantially coincident to one another. In the example shown in FIG. 7, it is preferable that R1≈R2≈R3≈R4≈R5≈R6. More specifically, all the curvature radii R of the micro-lenses 111 are preferably put within a range of ±20% relatively to an average $R_{ave}$ of the curvature radii R of the micro-lenses 111, and more preferably put within a range of ±10%. That is, all of curvature radii Rn of micro-lenses belonging to each unit (n=1 to N, N is the number of apexes of the micro-lenses belonging to the unit (N≥4)) preferably satisfy the following conditional expression (5), and more preferably satisfy the following conditional expression (6). The curved surface shape of each micro-lens affects a scattering angle. Therefore, when the micro-lenses have different curvature radii from one another, the micro-lenses have different scattering angles from one another. Thus, a scattering angle distribution occurs in the image display region. A scattering angle of an incident beam is obtained in a superimposing manner of scattering light caused in the incident beam by the micro-lenses. Therefore, when micro-lenses having the same curvature radius are used, the distribution of light quantity in an outgoing light beam can be controlled easily. For example, control can be made easily to make the light quantity within the scattering angle uniform independently of an angle from the center of the image display region.

$$0.8 \times R_{ave} \leq Rn \leq 1.2 \times R_{ave} \qquad (5)$$

$$0.9 \times R_{ave} \leq Rn \leq 1.1 \times R_{ave} \qquad (6)$$

In addition, all the micro-lenses 111 may be convex type ones, and each micro-lens 111 may have a spherical surface shape, or have a parabolic surface shape or an aspherical surface shape expressed by an elliptic function. In addition, the upper limit of the aforementioned maximum difference $\Delta h_{max}$ is preferably within 10% of $R_{ave}$ in order to make it easy to control the distribution of light quantity in the outgoing light beam, for example, in order to easily make control to make the light quantity within the scattering angle uniform independently of an angle from the center of the image display region. That is, it is preferable that the maximum difference $\Delta h_{max}$ satisfies the following conditional expression (7).

$$0.1 \times R_{ave} \geq \Delta h_{max} \qquad (7)$$

In addition, the aforementioned $D_{ave}$ or the aforementioned standard pitches Pu and Pv may be used as an index corresponding to an average pitch P of the micro-lenses 111 in the aperiodic lens array unit 11. When each of those values is set as P, P is preferably twice or less of length of a corresponding side of a display pixel, and more preferably once or less of the length. In addition, in terms of suppression of speckle noise, P is preferably 1/10 or more, and more preferably 1/5 or more. Incidentally, diagonal length may be used as the length of the corresponding side for $D_{ave}$. On the other hand, for Pu and Pv, lengths in the same axial directions as Pu and Pv may be used. When the average pitch P is too large, resolution deteriorates. For example, in an image light projection screen for HUD, a preferable display pixel has a pixel size of about 50 μm to 200 μm. As described above, the average pitch is preferably twice or less of the length of the corresponding side of the display pixel. It is therefore preferable that the upper limit of the average pitch P is set within a range of from 100 μm (corresponding to a display pixel of 50 μm) to 400 μm (corresponding to a display pixel of 200 μm). In addition, particularly in the image light projection screen for HUD, it is more preferable that the upper limit of the average pitch P is set within a range of from 50 μm to 200 μm. Further, in the image light projection screen for HUD, the lower limit of the average pitch P is set preferably within a range of from 5 µm to 20 µm, and more preferably within a range of from 10 µm to 40 µm. In addition, when the average pitch P satisfies the following conditional expression (8) with $R_{ave}$, the scattering angle can be made not larger than 40°.

$$R_{ave}/P \geq 0.9 \tag{8}$$

As has been described, to make it possible for human beings to recognize image light projected on a screen, the screen must have a certain level of scattering performance with respect to incident light as an optical characteristic of the screen. In addition, when the screen is used in a rear projector or the like, it is requested to disperse video light to some extent (at least a predetermined angle) particularly in a vertical direction and in a left/right direction in order to focus a video image on the screen and in order to expand a viewing angle. Incidentally, the required scattering performance differs from one application to another. For example, in an application for a head-up display, it is preferable that the scattering angle is 10° to 40°. In addition, for example, in an application for a rear projector, it is preferable that the scattering angle is at least 100°. In addition, it is preferable that the light quantity within the scattering angle is uniform independently of an angle, because the brightness of the image is fixed independently of an angle with which the screen is observed. That is, the viewing angle can be expanded favorably. In addition, the scattering angle in the horizontal direction and the scattering angle in the vertical direction do not have to be identical to each other but may depend on the viewing angle of the screen.

Figure 8A:
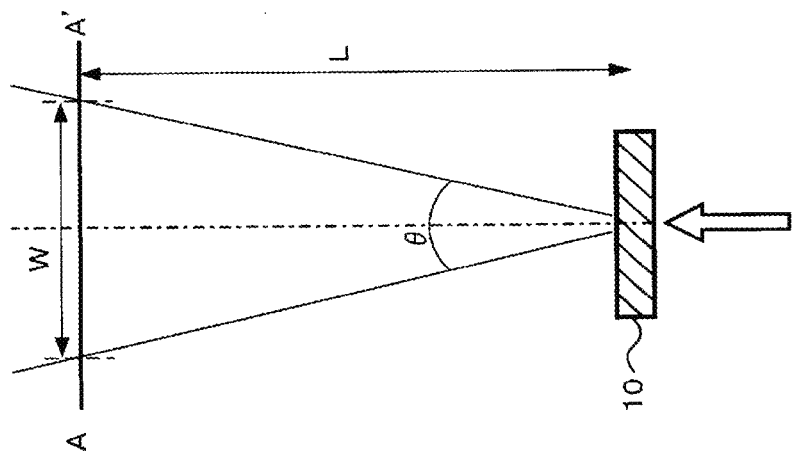
FIGS. 8A and 8B are explanatory views for explaining a scattering angle.
Figure 8B:
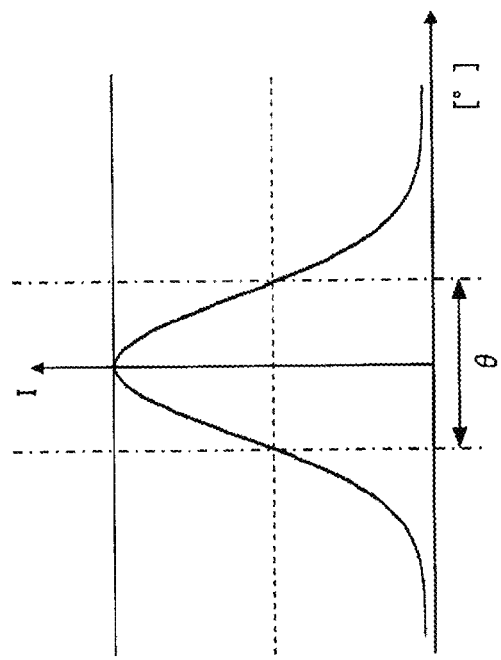

Incidentally, the scattering angle is defined as an angle satisfying full width at half maximum (FWHM) as to the intensity distribution of light transmitted by the image light projection screen 10. The scattering angle will be described specifically with reference to FIG. 8A and FIG. 8B. FIG. 8A is a schematic view showing a state of light incident on the image light projection screen 10 according to the embodiment and light scattered and transmitted thereby. FIG. 8A shows a section taken on line A-A' perpendicular to the linear travelling direction of incident light and at a distance L enough far from the image light projection screen 10. Incidentally, the distance L [mm] is a distance large enough to ignore the thickness of the image light projection screen 10. FIG. 8B is a view showing a distribution of light intensity when an angle between an optical axis and a light beam is used as abscissa. The light beam starts at a point where the image light projection screen 10 crosses the optical axis, and the light beam travels toward the section taken on line A-A'. Here, assume that a scattering angle θ [°] designates an angle obtaining full width at half maximum as to the light intensity, and W [mm] designates a dispersion region of the section taken on line A-A', where the scattering angle θ can be obtained. In this case, the scattering angle θ and the distance L can be expressed by $\tan(\theta/2)=W/2L$.

It is preferable that the distribution of light quantity within a desired scattering angle formed on a predetermined projection surface by scattering light emitted from the image light projection screen 10 is within ±20% relatively to light quantity at a central point because the distribution of light quantity can be made uniform. Accordingly, it is preferable that the curvature radius of each micro-lens is designed so that a light beam emitted from the image light projection screen 10 can have such a distribution of light quantity.

In addition, the period of the aperiodic lens array units 11 is preferably ten times or less of the diagonal length of a display pixel, and more preferable five times or less. When the curvature radius is too large, there is a fear that the advantage obtained by a periodic structure may be suppressed to generate an interference pattern due to a random structure.

In addition, the micro-lenses 111 may be formed out of translucent glass, resin, etc. An example of a method for forming lens shapes on a glass surface may include a method in which a resist pattern of the lens shapes is formed by wet etching, gray scale exposure or resist reflow, and the glass surface is then dry-etched, or a method in which press forming is performed with a forming mold. On the other hand, an example of a method for forming lens shapes out of resin may include injection molding, imprinting on a surface of a glass substrate, etc. Further, an antireflection film such as a dielectric multi-layer film may be formed on the front and back surfaces of micro-lenses in the image light projection screen 10 in order to suppress reflection of incident light.

As has been described above, the image light projection screen 10 according to the embodiment has a configuration in which micro-lens arrays each having an aperiodic structure are arranged periodically. Accordingly, it is possible to reduce a diffraction pattern or moire caused by a periodic structure while suppressing speckle noise caused by a random structure. As a result, it is possible to further suppress deterioration in image quality.

Speckle noise is caused by glare occurring due to random interference caused by an aperiodic scattering plate. Therefore, the aperiodic lens array units 11 are disposed periodically while aperiodicity of micro-lenses in each aperiodic lens array unit 11, or more specifically the degree of dispersion in two-dimensional layout and/or in a height direction is suppressed within ±10%. Thus, speckle noise caused by the aperiodicity can be reduced. In addition, a diffraction pattern or moire is caused by regular interference caused by periodicity. The micro-lenses are disposed non-periodically within each aperiodic lens array unit 11. It is therefore also possible to break the periodicity to thereby reduce the diffraction pattern or moire.

Embodiment 2

Figure 9:
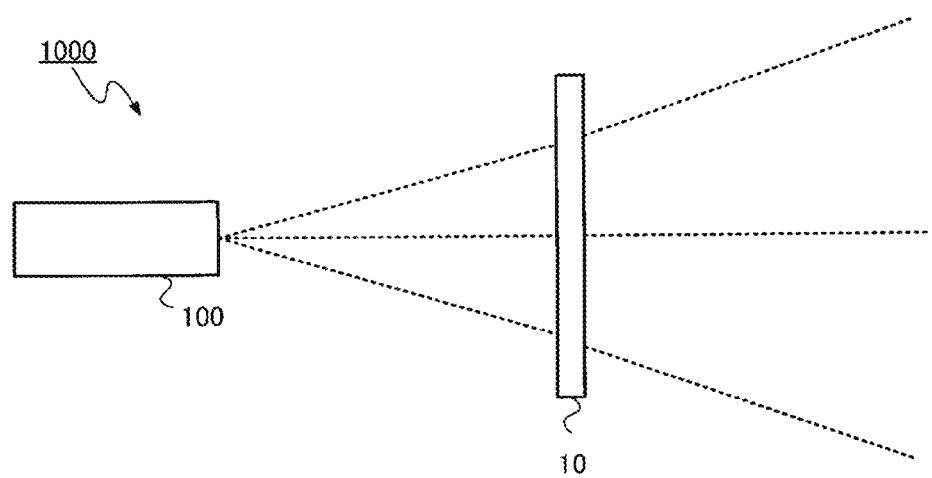
FIG. 9 is a schematic view showing an example of a display system according to a second embodiment.

Next, a second embodiment of the invention will be described. FIG. 9 is a schematic view showing an example of a display system according to the embodiment. A display system 1000 shown in FIG. 9 has an image projection apparatus 100, and an image light projection screen 10. Incidentally, the image light projection screen 10 may be similar to the image light projection screen 10 according to the first embodiment.

A general image projection apparatus may be used as the image projection apparatus 100. For example, the image projection apparatus 100 may be a so-called projector, which includes a light source, an image light forming unit (such as a light valve) that modulates a beam of light emitted from the light source in accordance with image information so as to form image light, and a projection optical system that enlarges and projects the formed image light toward a predetermined screen surface. In addition, the projector may be a scanning type one or a projection type one.

In the display system 1000, the image light projection screen 10 is disposed on the front surface side of the image projection apparatus 100 (on the side where there are audiences) so that image light projected from the back surface side can be projected toward the front surface side. More specifically, by the image light projection screen 10, image light incident thereon from the back surface side is emitted toward the front surface side while being refracted and diffused.

Figure 10:
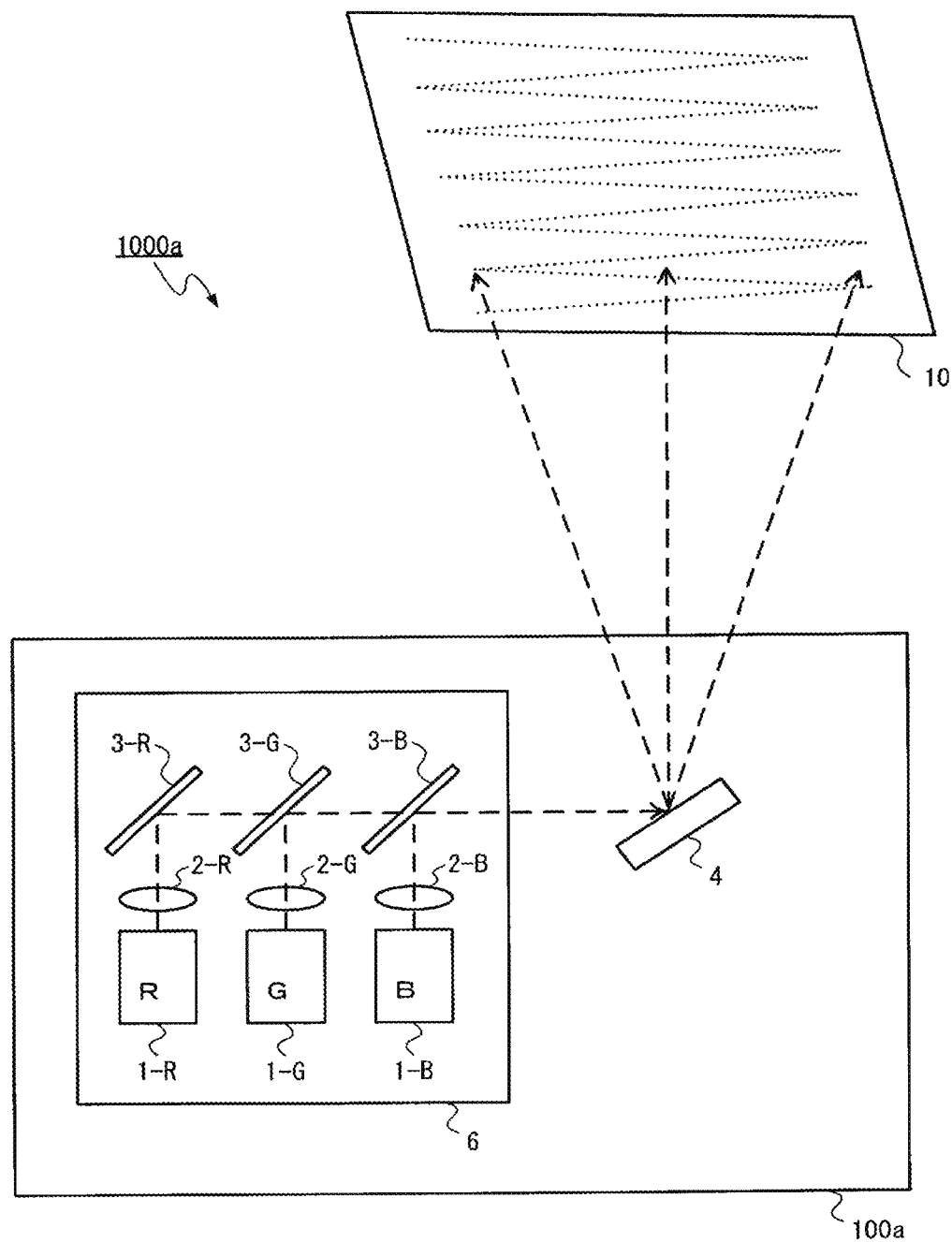
FIG. 10 is a configuration view showing a more detailed configuration example of a display system 1000.

FIG. 10 shows an example of a more detailed configuration view of the display system 1000. A display system 1000a shown in FIG. 10 has a scanning type image projection apparatus 100a and an image light projection screen 10. The image light projection screen 10 will be also referred to as screen 10 simply below.

The scanning type image projection apparatus 100a has a 2D scan mirror 4 for scanning a display surface of the screen 10 with light, and a light source optical system 6 for guiding coherent light to the 2D scan mirror 4. According to another configuration, a first scan mirror for scanning with light in a lateral direction, and a second scan mirror for scanning with light in a longitudinal direction may be provided in place of the 2D scan mirror 4.

Here, as the 2D scan mirror 4, a micromechanical mirror or the like formed by MEMS technology is advantageous in terms of miniaturization. In addition, galvanomirrors may be used as the aforementioned first and second scan mirrors. Alternatively, one of the mirrors may be a galvanomirror while the other mirror is a micromechanical mirror.

In addition, for example, the light source optical system 6 may include one or more light source portions 1 for emitting coherent light, collimator lenses 2 by which the light emitted from the light source portions 1 can be converted into parallel light, and dichroic mirrors 3 by which the parallel light emitted from the collimator lenses 2 can be guided to the 2D scan mirror 4.

The scanning type image projection apparatus 100a shown in FIG. 10 includes laser light sources 1-R, 1-G and 1-B corresponding to three colors of red, green and blue as the light source portions 1 for emitting coherent light. For example, semiconductor lasers, solid lasers, etc. are used as the laser light sources 1-R, 1-G and 1-B. Light emitted from the laser light sources 1-R, 1-G and 1-B is collected into substantially parallel light by collimator lenses 2-R, 2-G and 2-B respectively, and enters into dichroic mirrors 3-R, 3-G and 3-B respectively. Then, the light is synthesized by the dichroic mirrors 3-R, 3-G and 3-B. Laser light of three primary colors synthesized thus is obliquely incident on a mirror surface of the 2D scan mirror 4. Here, the substantially parallel light means that a spread angle of the laser light is not larger than about 2 mrad.

The light reflected by the 2D scan mirror 4 reaches the screen 10. At this time, the 2D scan mirror 4 is driven by a not-shown mirror control unit so as to be rotated horizontally and vertically in accordance with a predetermined scanning frequency. Due to this rotation, the normal direction of the incident surface of the light in the 2D scan mirror 4 is changed relatively to the optical axis of the laser light incident thereon. Thus, the optical axis of the laser light reflected by the surface is changed whenever the 2D scan mirror 4 is rotated. In this manner, a predetermined partial region is irradiated with the laser light reflected by the 2D scan mirror 4 while the screen surface is scanned with the laser light moving thereon. Thus, a desired image is displayed all over the screen surface of the screen 10.

Figure 11:
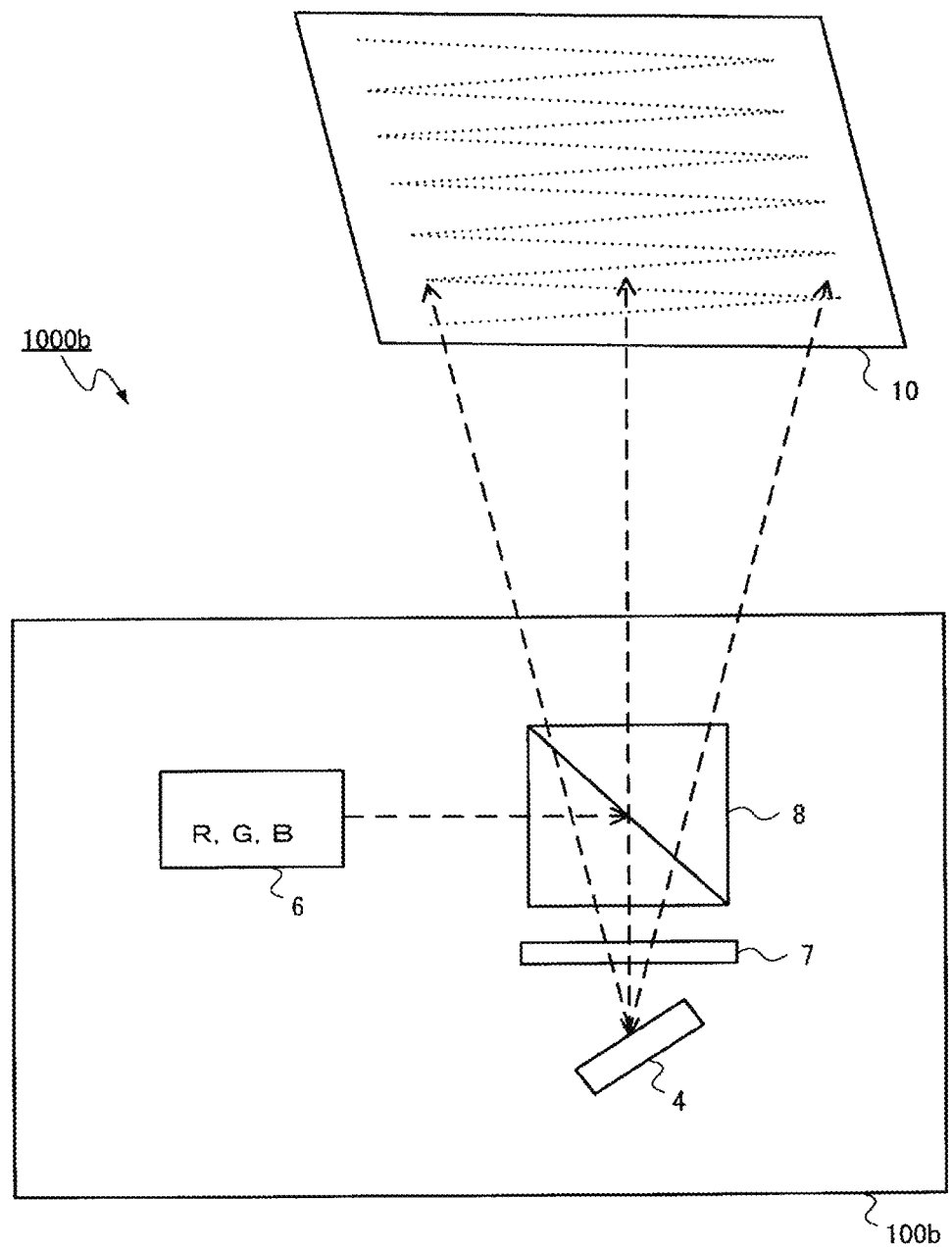
FIG. 11 is a configuration view showing another example of the display system 1000.

In addition, the image projection apparatus 100 is not limited to the configuration shown in FIG. 10. FIG. 11 is a configuration view showing another example of the display system 1000 according to the embodiment, which is different from the configuration shown in FIG. 10 at the point that a scanning type image projection apparatus 100b is provided in place of the scanning type image projection apparatus 100a.

The scanning type image projection apparatus 100b has a 2D scan mirror 4 for scanning a display surface of the screen 10 with light, a light source optical system 6 including at least one light source portion 1 for emitting coherent light, a polarization beam splitter 8, and a ¼-wavelength plate 7 for changing a polarization direction of light incident thereon.

In the scanning type image projection apparatus 100b, linearly polarized light emitted from the light source optical system 6 is reflected by the polarization beam splitter 8 and passed through the ¼-wavelength plate 7 so as to be formed into circularly polarized light, which is incident on a mirror surface of the 2D scan mirror 4.

After that, the light reflected by the 2D scan mirror 4 is passed through the ¼-wavelength plate 7 again so as to be converted into linearly polarized light, which is light polarized in a direction perpendicular to the light incident on the polarization beam splitter 8. The linearly polarized light moves straightly through the polarization beam splitter 8 and reaches the screen 10.

Figure 12:
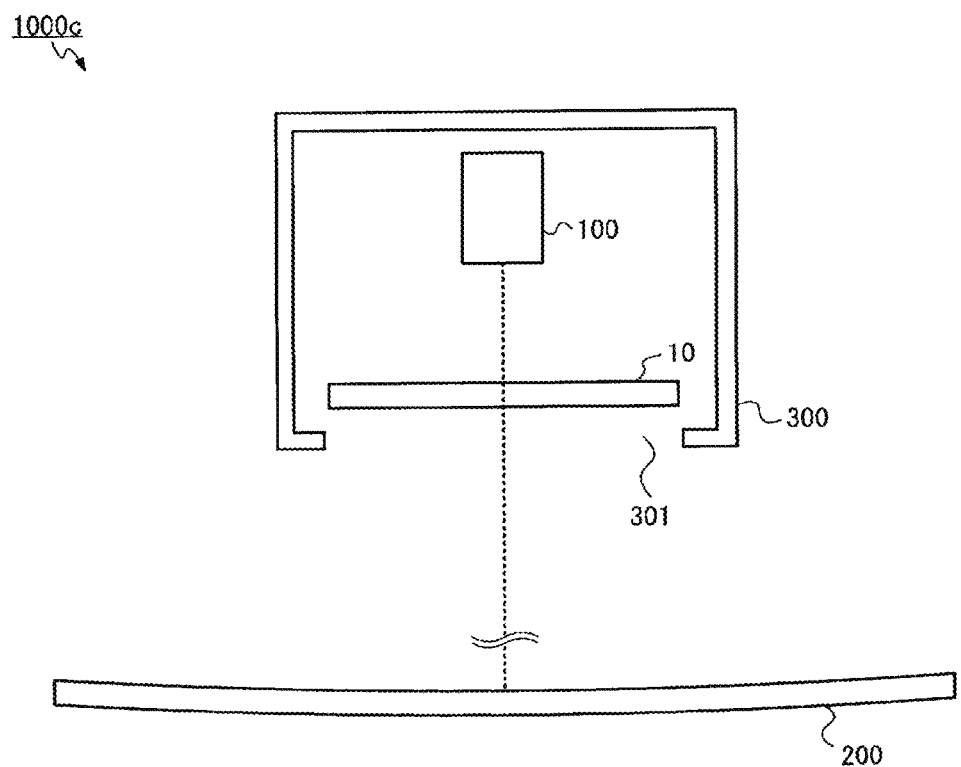
FIG. 12 is a schematic sectional view showing another example of the display system 1000.

In addition, the display system 1000 may be a display system 1000c to be used as HUD as shown in FIG. 12.

The display system 1000c shown in FIG. 12 has an image projection apparatus 100 for enlarging and projecting image light on a predetermined screen surface, an exterior housing 300 having a box-like shape for receiving the image projection apparatus 100, an image light projection screen 10 as a transmission type screen for projecting the image light emitted from the image projection apparatus 100, and a combiner 200.

In this example, an opening portion 301 is formed on the front surface side (audience side) of the exterior housing 300. In this configuration, the image light projection screen 10 may be exposed through the opening portion 301 of the exterior housing 300 so that the image light projected from the back side can be projected toward the front surface side. Incidentally, the image light projection screen 10 does not have to be exposed (see FIG. 15, which will be described later). That is, the image light projection screen 10 may be provided for projection in an optical path including the opening portion 301.

Figure 13:
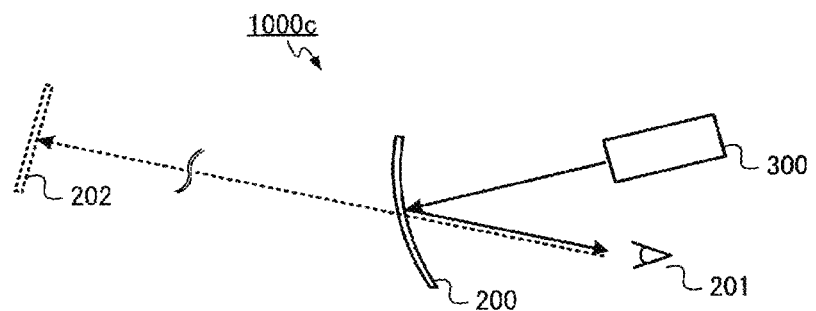
FIG. 13 is an explanatory view showing an example of an optical system of a display system 1000c.

The combiner 200 reflects a part of light from the image light projection screen 10 and transmits a part of external light so that an image and a background can be displayed to be superimposed on each other. A reflection surface of the combiner 200 may have a concave surface shape. When the reflection surface of the combiner 200 has a concave surface shape, the reflection surface serves as a concave mirror and functions in the same manner as a convex lens. In such a case, an audience 201 can see an image (more specifically, a virtual image 202) through the combiner 200 as if it were enlarged and displayed in a distance (see FIG. 13).

In the display system 1000c shown in FIG. 12, the image projection apparatus 100 is provided as a light source for HUD. In the following description, the exterior housing 300 together with elements inside the exterior housing 300 will be also referred to as body apparatus.

Figure 14:
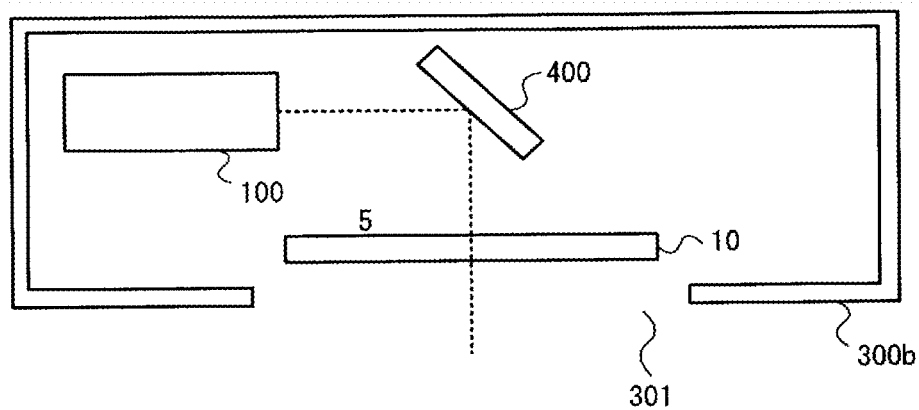
FIG. 14 is a schematic sectional view showing another example of a body apparatus in the display system 1000c.
Figure 15:
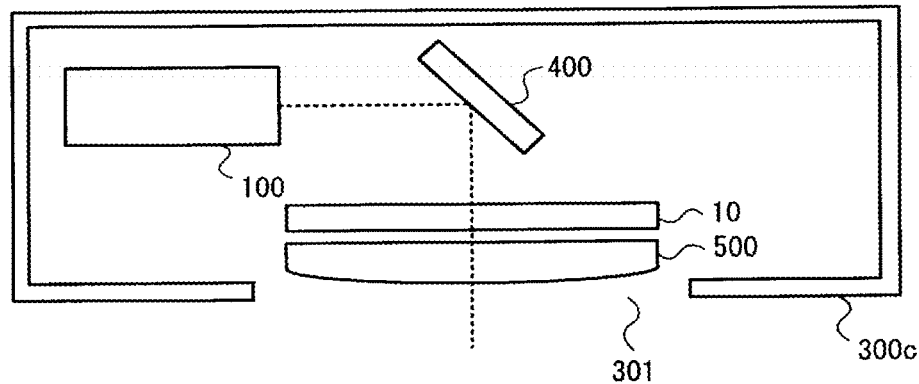
FIG. 15 is a schematic sectional view showing another example of the body apparatus in the display system 1000c.

In addition, FIG. 14 and FIG. 15 are schematic sectional views showing other examples of the body apparatus in the display system 1000c. As shown in FIG. 14, the display system 1000c may be provided with a mirror 400 so that image light emitted from the image projection apparatus 100 can be guided to the image light projection screen 10. In addition, as shown in FIG. 15, the display system 1000c may be provided with a field lens 500 as one element of the body apparatus on the front surface side of the image light projection screen 10. The field lens 500 changes the direction of light emitted from the image light projection screen 10 or corrects distortion of the light. In addition, though not shown, another element such as a lens for propagating light efficiently may be provided on the back surface side of the image light projection screen 10.

EXAMPLE

Example 1

Next, a first example of the invention will be described. This example is an example of the image light projection screen 10 shown in FIG. 1A.

Figure 16:
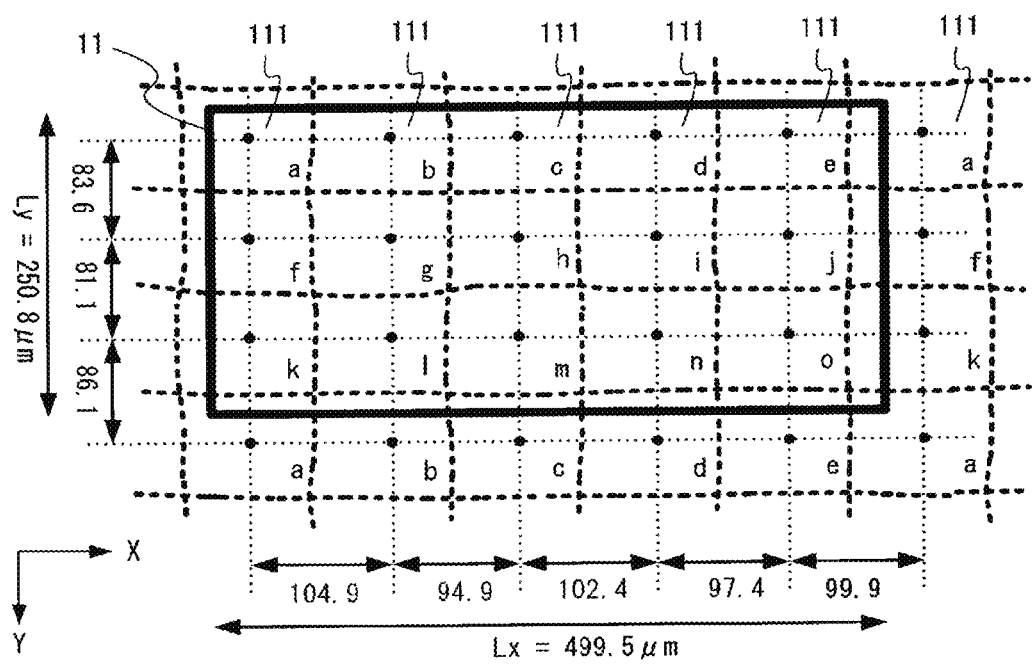
FIG. 16 is a schematic top view showing an aperiodic lens array unit 11 in the image light projection screen 10 according to the first embodiment.

The image light projection screen 10 according to the example has an image display region filled with a repeating structure of a set of micro-lenses 111 arranged in three rows and five columns non-periodically and without any gap substantially along two axial directions (X-axis direction and Y-axis direction in FIGS. 1A and 1B) perpendicular to each other and parallel with sides of the image light projection screen 10. FIG. 16 is a schematic top view showing an example of an aperiodic lens array unit 11 in the image light projection screen 10 according to the example. Also in FIG. 16, the thick broken lines designate boundaries among the micro-lenses 111, and black dots designate positions of apexes of the micro-lenses 111.

As shown in FIG. 16, the aperiodic lens array unit 11 according to the example has a rectangular shape, including 15 apexes of micro-lenses 111 each having a curved surface shape and arranged without any gap and non-periodically. In the example shown in FIG. 16, the aperiodic lens array unit 11 includes apexes of 15 micro-lenses 111a to 111o. The following distances are set between the apexes of the micro-lenses in this example. That is, when the aforementioned expression method is used, in the X-axis direction, $Dx_{ab}=Dx_{fg}=Dx_{kl}=104.9$ μm, $Dx_{bc}=Dx_{gh}=Dx_{lm}=94.9$ μm, $Dx_{cd}=Dx_{hi}=Dx_{mn}=102.4$ μm, $Dx_{de}=Dx_{ij}=Dx_{no}=97.4$ μm, and $Dx_{ea}=Dx_{jf}=Dx_{ok}=99.9$ μm. On the other hand, in the Y-axis direction, $Dy_{af}Dy_{bg}Dy_{ch}=Dy_{di}=Dy_{ej}=83.6$ μm, $Dy_{fk}=Dy_{gl}=Dy_{hm}=Dy_{in}=Dy_{jo}=81.1$ μm, and $Dy_{ka}=Dy_{lb}=Dy_{mc}=Dy_{nd}=Dy_{oe}=86.1$ μm. Closest distances shown in FIG. 17 are set between the apexes of the micro-lenses within the aperiodic lens array unit 11 shown in FIG. 16. In addition, other specific parameters have the following values.

unit size: length in X-axis direction=499.5 μm (Lx in FIG. 16), and length in Y-axis direction=250.8 μm (Ly in FIG. 16)

number of micro-lenses within unit: number of apexes in X-axis direction=5, and number of apexes in Y-axis direction=3, totaled 15 apexes average of closest distances between apexes of micro-lenses within unit: $D_{ave}=81.9$ μm range of variation of closest distances between apexes of micro-lenses within unit: $D_{ave}=81.9$ μm±3% average of curvature radii of micro-lenses within unit: $R_{ave}=104$ μm range of variation of curvature radii of micro-lenses within unit: 104 μm±15% maximum difference in height between apexes of micro-lenses within unit: $\Delta h_{max}=5$ μm Incidentally, the image display region of the image light projection screen 10 according to the example is filled with a repeating structure of one kind of aperiodic lens array unit having a rectangular outer edge shape. Accordingly, the layout of the aperiodic lens array unit 11 shown in FIG. 16 is merely exemplary. The overall structure is not changed if it is separated at any place.

In addition, the image light projection screen 10 according to the example is manufactured as follows. First, a molybdenum film having a film thickness of 50 nm is formed on one surface of a glass substrate having a refractive index n=1.53, as a mask for wet etching. Next, resist is applied onto the molybdenum film formed thus. A molybdenum mask pattern is formed by photolithography and etching. The molybdenum mask pattern has an opening portion corresponding to a periodic structure of the aperiodic lens array unit 11 shown in FIG. 16, that is, a repeating structure of a set of micro-lenses arranged in three rows and five columns non-periodically and without any gap in the X-axis direction and the Y-axis direction.

After that, one surface of the glass substrate is etched to be 100 μm deep by wet etching. Thus, an image light projection screen 10 in which each concave curved surface portion has a curvature radius of 100 μm is obtained.

When light with a wavelength of 450 nm was incident on the image light projection screen 10 obtained thus, a scattering angle of about 30° was obtained. In addition, there occurred no diffraction pattern. It was therefore proved that regular interference was suppressed due to aperiodicity.

Comparative Example 1

Next, a first comparative example for the first example will be described. The first comparative example is a scattering plate having a random concavity and convexity structure in its surface. Specifically, the scattering plate is obtained in such a manner that one surface of a glass substrate is processed by sand blasting. The scattering plate is characterized by a scattering angle of about 15° due to the random irregularity structure.

In a display system using an image light projection screen, the first example and the first comparative example are placed as the image light projection screen, and images projected by laser light with a wavelength of 532 nm were confirmed. Deterioration in image quality caused by speckle noise was suppressed when the image light projection screen 10 according to the first example was used. The image quality better than that when the scattering plate according to the first comparative example was used could be obtained.

Comparative Example 2

Next, a second comparative example for the first example will be described. The second comparative example includes a flat region within an image display region. That is, the second comparative example is an example of an image light projection screen in which the filling rate of micro-lenses is smaller than 100%.

In this comparative example, one surface of a glass substrate is etched to be 42 μm deep by wet etching, using a molybdenum mask pattern similar to that in the first example. In this manner, a portion in which a curved surface is not formed because lens curved surfaces adjacent to each other in the X-axis direction are not connected to each other survives with a width of about 15 μm. Thus, an image light projection screen in which the filling rate does not reach 100% is formed. Incidentally, the average of curvature radii of micro-lenses within each unit is 42 μm.

When the image light projection screen formed thus is used in a display system, incident light is not scattered but transmitted as straight light in the flat region where no lens surface is not formed. As a result, the light quantity in a direction of 0° is very large to be about 35%. Therefore, the image light projection screen is not suitable as a screen for projecting image light.

The present application is based on a Japanese Patent Application filed on Sep. 30, 2014, that is, Japanese Patent Application No. 2014-200987, the contents of which are incorporated herein by reference.

INDUSTRIAL APPLICABILITY

The invention can be applied suitably for a screen for projecting image light, and an apparatus (display system) using the screen.

DESCRIPTION OF REFERENCE NUMERALS 10 image light projection screen
11, 11a, 11b aperiodic lens array unit
111, 111a, 111b, 111c, 111d, 111e, 111f, 111g, 111h micro-lens
12 main surface
13 image display region
100 image projection apparatus
100a, 100b scanning type image projection apparatus
1 light source portion
1-R, 1-G, 1-B laser light source
2 collimator lens
3 dichroic mirror
4 2D scan mirror
6 light source optical system
7 ¼-wavelength plate
8 polarization beam splitter
1000, 1000a, 1000b, 1000c display system
201 audience
202 virtual image
300 exterior housing
301 opening portion
200 combiner
400 mirror
500 field lens

The invention claimed is:

1. An image light projection screen comprising:
a plurality of aperiodic lens array units on a main surface of the image light projection screen, the aperiodic lens array units being arrayed two-dimensionally regularly and without any gap at least within an image display region; wherein:
each of the aperiodic lens array units includes at least four apexes of micro-lenses each having a curved surface shape and arranged without any gap and non-periodically, and has symmetry keeping continuity of the curved surface shapes of the micro-lenses located in a boundary portion.

2. The image light projection screen according to claim 1, wherein:
the image display region is filled with a repeating structure of a single kind of aperiodic lens array unit whose outer edge shape is quadrangular or hexagonal.

3. The image light projection screen according to claim 1, wherein:
in each of the aperiodic lens array units, each Dn (n=1 to a number of apexes of micro-lenses) satisfies $0.9 \times D_{ave} \leq Dn \leq 1.1 \times D_{ave}$, when Dn designate closest distances between the apexes of the micro-lenses belonging to the aperiodic lens array unit, and $D_{ave}$ designates an average of the closest distances Dn of the micro-lenses.

4. The image light projection screen according to claim 2, wherein:
in each of the aperiodic lens array units, each Dn (n=1 to a number of apexes of micro-lenses) satisfies $0.9 \times D_{ave} \leq Dn \leq 1.1 \times D_{ave}$, when Dn designate closest distances between the apexes of the micro-lenses belonging to the aperiodic lens array unit, and $D_{ave}$ designates an average of the closest distances Dn of the micro-lenses.

5. The image light projection screen according to claim 1, wherein:
each of the aperiodic lens array units includes micro-lenses different in apex height, which is a distance in a height direction between a reference plane and an apex of a curved surface of each of the micro-lenses; and
in each of the aperiodic lens array units, an optical path length of a maximum difference $\Delta h_{max}$ among differences in height between the apexes of the micro-lenses is not smaller than λ, which is at least one of target wavelengths.

6. The image light projection screen according to claim 2, wherein:
each of the aperiodic lens array units includes micro-lenses different in apex height, which is a distance in a height direction between a reference plane and an apex of a curved surface of each of the micro-lenses; and
in each of the aperiodic lens array units, an optical path length of a maximum difference $\Delta h_{max}$ among differences in height between the apexes of the micro-lenses is not smaller than λ, which is at least one of target wavelengths.

7. The image light projection screen according to claim 3, wherein:
each of the aperiodic lens array units includes micro-lenses different in apex height, which is a distance in a height direction between a reference plane and an apex of a curved surface of each of the micro-lenses; and
in each of the aperiodic lens array units, an optical path length of a maximum difference $\Delta h_{max}$ among differences in height between the apexes of the micro-lenses is not smaller than λ, which is at least one of target wavelengths.

8. The image light projection screen according to claim 4, wherein:
each of the aperiodic lens array units includes micro-lenses different in apex height, which is a distance in a height direction between a reference plane and an apex of a curved surface of each of the micro-lenses; and
in each of the aperiodic lens array units, an optical path length of a maximum difference $\Delta h_{max}$ among differences in height between the apexes of the micro-lenses is not smaller than λ, which is at least one of target wavelengths.

9. The image light projection screen according to claim 1, wherein:
each of the micro-lenses has a concave shape.

10. The image light projection screen according to claim 1, wherein:
each of the micro-lenses has a convex shape.

11. The image light projection screen according to claim 1, wherein:
in each of the aperiodic lens array units, each Rn (n=1 to a number of apexes of micro-lenses) satisfies $0.8 \times R_{ave} \leq Rn \leq 1.2 \times R_{ave}$, when Rn designate curvature radii of the micro-lenses belonging to the aperiodic lens array unit, and $R_{ave}$ designates an average of the curvature radii Rn.

12. The image light projection screen according to claim 1, wherein:
in each of the aperiodic lens array units, a maximum difference $\Delta h_{max}$ among differences in height between the apexes of the micro-lenses satisfies $0.1 \times R_{ave} \geq \Delta h_{max}$, when $R_{ave}$ designates an average of curvature radii of the micro-lenses belonging to the aperiodic lens array unit.

13. The image light projection screen according to claim 1, wherein:
$D_{ave}$ is twice or less of length of a diagonal line of a display pixel when $D_{ave}$ designates an average of closest distances between apexes of micro-lenses belonging to the aperiodic lens array unit.

14. The image light projection screen according to claim 1, wherein:
a first standard pitch Pu and a second standard pitch Pv are twice or less of corresponding axial lengths of a display pixel when the first standard pitch Pu and the second standard pitch Pv are Lu/M and Lv/J, where Lu and Lv designate any two lengths in axial directions crossing each other in the aperiodic lens array unit, M designates a number of apexes of micro-lenses arrayed in a first axial direction, which is the axial direction of the length Lu in a region measuring the length Lu, and J designates a number of apexes of micro-lenses arrayed in a second axial direction, which is the axial direction of the length Lv in a region measuring the length Lv.

15. The image light projection screen according to claim 1, wherein:
each of the aperiodic lens array units satisfies $R_{ave}/D_{ave} \geq 0.9$ when $D_{ave}$ designates an average of closest distances between apexes of micro-lenses belonging to the aperiodic lens array unit, and $R_{ave}$ designates an average of curvature radii of the micro-lenses.

16. The image light projection screen according to claim 1, wherein:
a period of the aperiodic lens array units is 10 times or less of a diagonal length of a display pixel.

17. The image light projection screen according to claim 1, wherein:
a scattering angle ranges from 10° to 40°.

18. A display system comprising:
an image projection apparatus including a light source that emits coherent light, an image light forming unit that modulates a beam of the light emitted from the light source in accordance with image information so as to form image light, and a projection optical system that enlarges and projects the image light toward a predetermined screen surface; and
an image light projection screen including a plurality of aperiodic lens array units on a main surface of the image light projection screen, the aperiodic lens array units being arrayed two-dimensionally regularly and without any gap at least within an image display region; wherein:
the image light projection screen is a transmission type screen; and
each of the aperiodic lens array units includes at least four apexes of micro-lenses each having a curved surface shape and arranged without any gap and non-periodically, and has symmetry keeping continuity of the curved surface shapes of the micro-lenses located in a boundary portion.

19. The display system according to claim 18, wherein:
the display system is a head-up display;
the display system further comprises a box-like exterior housing that receives the image projection apparatus;
an opening portion is formed on a front surface side of the exterior housing; and
the transmission type screen is disposed in an optical path including the opening portion so that the image light projected from a back side of the transmission type screen can be projected toward a front side thereof.

* * * * *